| United States Patent [19] | [11] Patent Number: 4,831,001 |
| Evans et al. | [45] Date of Patent: May 16, 1989 |

[54] CYCLIC POLYCARBONATE OLIGOMERS: INHIBITION AND CONTROL OF POLYMERIZATION TO LINEAR POLYCARBONATES

[75] Inventors: Thomas L. Evans, Clifton Park; Carol B. Berman, Schenectady, both of N.Y.

[73] Assignee: General Electric Company, Schenectady, N.Y.

[21] Appl. No.: 218,172

[22] Filed: Jul. 11, 1988

Related U.S. Application Data

[62] Division of Ser. No. 88,457, Aug. 24, 1987, which is a division of Ser. No. 924,713, Oct. 30, 1986, Pat. No. 4,746,726.

[51] Int. Cl.$^4$ .............................................. B01J 31/14
[52] U.S. Cl. ................................. 502/153; 502/150; 502/152; 502/154; 502/155; 502/164; 502/170; 502/171

[58] Field of Search ............... 502/153, 154, 155, 164, 502/170, 171, 150, 152

[56] References Cited

U.S. PATENT DOCUMENTS

| 4,605,731 | 8/1986 | Evans et al. | 528/370 X |
| 4,644,053 | 2/1987 | Brunelle et al. | 528/370 X |
| 4,675,304 | 6/1987 | Evans et al. | 502/153 |

Primary Examiner—Patrick P. Garvin
Attorney, Agent, or Firm—William H. Pittman; James C. Davis, Jr.

[57] ABSTRACT

Lewis acids such as triphenyl borate, triphenylborane and aluminum isopropoxide are employed to inhibit or control the formation of linear polycarbonates from cyclic polycarbonate oligomers. Inhibition of polymerization initiated by impurities in the cyclics is noted. When polymerization is effected by basic polycarbonate formation catalysts, the Lewis acids can act as reaction rate accelerators or inhibitors depending on reaction parameters.

5 Claims, 3 Drawing Sheets

CYCLIC POLYCARBONATE OLIGOMERS: INHIBITION AND CONTROL OF POLYMERIZATION TO LINEAR POLYCARBONATES

This application is a division of Ser. No. 088,457, filed Aug. 24, 1987, which is a division of Ser. No. 924,713, filed Oct. 30, 1986 and now U.S. Pat. No. 4,746,726.

This invention relates to cyclic polycarbonate oligomers and methods for their stabilization and polymerization.

The conversion of low molecular weight cyclic aromatic carbonate polymers to linear polycarbonates is known. Reference is made, for example, to the following U.S. Pat. Nos.: 3,155,683, 3,274,214, 3,386,954, 3,422,119.

More recently, cyclic polycarbonate oligomer mixtures have been prepared and converted to linear polycarbonates, often of very high molecular weight, by contact with various polycarbonate formation catalysts. Reference is made to U.S. Pat. No. 4,605,731, European patent application No. 162,379 and copending, commonly owned application Ser. No. 704,122, filed Feb. 22, 1985 now U.S. Pat. No. 4,644,053, the disclosures of which are incorporated by reference herein. The polycarbonate formation catalysts disclosed as useful in said application include various bases and Lewis acids.

The conversion of cyclic polycarbonate oligomer mixtures to linear polycarbonates has high potential for utilization in reactive processing methods, such as pultrusion, rotational molding and polymerization in a mold for direct production of molded articles, and in composite formation. One reason for this is the low melt viscosity of the oligomer mixtures, as a result of which handling thereof and wetting of filler materials are simple, convenient and efficient.

Certain problems are occasionally encountered in the handling of cyclic polycarbonate oligomer compositions under conditions of low melt viscosity. Such conditions typically involve temperatures of at least about 200° C., frequently in the range of about 200°–275° C. for oligomer mixtures. At such temperatures, polymerization is typically initiated by the majority of polycarbonate formation catalysts and the melt viscosity of the oligomer composition consequently rises, sometimes to a value higher than convenient for reactive processing. Moreover, it is sometimes found that slow autocatalyzed polymerization occurs in such compositions even in the absence of catalyst, as a result of the action of impurities therein. It is of interest, therefore, to provide a method of stabilizing cyclic polycarbonate oligomer compositions to inhibit polymerization prior to the addition of polycarbonate formation catalyst, and also to facilitate control of the polymerization rate after catalyst has been introduced.

These objections are achieved by the present invention, which provides modified polycarbonate formation catalyst compositions as well as stabilized cyclic polycarbonate oligomer compositions. It also provides methods for stabilizing cyclic polycarbonate oligomer compositions and for controlling the polymerization rate of such compositions upon addition of a polycarbonate formation catalyst.

The invention is based on the discovery that Lewis acids of the formula wherein Z is boron or aluminum and each of $R^1$, $R^2$ and $R^3$ is a hydrocarbon or hydrocarbonoxy radical containing up to about 10 carbon atoms, are effective to inhibit autocatalyzed polymerization of cyclic polycarbonate oligomer compositions. Moreover, such Lewis acids may be employed in the presence of basic polycarbonate formation catalysts to modify the polymerization rate of such oligomer compositions. Under most circumstances, the polymerization rate is decreased; however, employment of small quantities of said Lewis acids may increase the polymerization rate when an increase thereof is desirable. Thus, the invention has numerous aspects, each of which is dealt with in detail hereinafter.

The Z value in the compounds of formula I is boron or aluminum. Boron compounds are particularly preferred because of their availability and efectiveness as Lewis acids under the conditions of the invention, as well as their compatibility with the linear polycarbonate polymerization product under usual conditions of use.

The $R^1$, $R^2$ and $R^3$ values may be aliphatic, alicyclic or aromatic hydrocarbon radicals. The aliphatic radicals are most often primary or secondary radicals containing about 1–6 carbon atoms, the alicyclic radicals typically contain about 5–10 carbon atoms and the aromatic radicals about 6–10 carbon atoms. The aromatic radicals, especially phenyl radicals, are generally preferred when Z is boron, and the aliphatic radicals when Z is aluminum.

The $R^{1-3}$ values may be either hydrocarbon or hydrocarbonoxy radicals. In general, compounds containing hydrocarbon radicals are somewhat stronger Lewis acids than those containing hydrocarbonoxy radicals, and the choice of Lewis acid under various circumstances will be apparent to those skilled in the art upon taking this into consideration.

Especially preferred compounds of formula I are triphenylborane and triphenyl borate. Other Lewis acids, not within formula I, may function as described herein but are generally not included in the invention by reason of various possible detrimental effects on the properties of polycarbonates produced from the cyclic oligomers.

The cyclic polycarbonate oligomers useful in the invention generally comprise structural units having the formula wherein at least about 60% of the total number of $R^4$ values are aromatic organic radicals and the balance thereof are aliphatic, alicyclic or aromatic organic radicals. The aliphatic or alicyclic $R^4$ values generally contain up to about 8 carbon atoms. The $R^4$ values may contain substituents such as halo, nitro, alkoxy, lactone and the like. Most often, however, all $R^4$ radicals are hydrocarbon radicals.

Preferably at least about 80% of the total number of $R^4$ values in the cyclic oligomer mixtures, and most desirably all of said $R^4$ values, are aromatic. The aromatic $R^4$ radicals preferably have the formula $$-A^1-Y-A^2-, \quad (III)$$

wherein each of $A^1$ and $A^2$ is a monocyclic divalent aromatic radical and Y is a bridging radical in which one or two carbon atoms separate $A^1$ from $A^2$. The free valence bonds in formula II are usually in the meta or para positions of $A^1$ and $A^2$ in relation to Y.

In formula III, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^4$ values may be considered as being derived from dihydroxy compounds of the formula $$HO-R^4-OH, \quad (IV)$$

especially dihydroxyaromatic compounds and preferably bisphenols of the formula $HO-A^1-Y-A^2-OH$. The following dihydroxy compounds are illustrative:
Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl)propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
$\alpha,\alpha'$-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
$\alpha,\alpha$-Bis(4-hydroxyphenyl)toluene
$\alpha,\alpha,\alpha',\alpha'$-Tetramethyl-$\alpha,\alpha'$-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl)ether
Bis(4-hydroxyphenyl)sulfide
Bis(4-hydroxyphenyl)sulfoxide
Bis(4-hydroxyphenyl)sulfone
Bis(3,5-dimethyl-4-hydroxyphenyl)sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic oligomers have degrees of polymerization from 2 to about 30. Cyclic oligomer mixtures are preferred, especially those in which the various molecular species have degrees of polymerization up to about 20, with a major proportion being up to about 12 and a still larger proportion up to about 15. Such mixtures have relatively low melting points as compared to single compounds such as the corresponding cyclic trimer. The cyclic oligomer mixtures are generally liquid at temperatures above 300° C., most often at temperatures above 225° C. and frequently above 200° C.

The cyclic oligomer mixtures contain very low proportions (if any) of linear oligomers. In general, no more than about 10% by weight, and most often no more than about 5%, of such linear oligomers are present. The mixtures also usually contain low percentages, if any (frequently less than 30% and preferably no higher than about 20%) of polymers (linear or cyclic) having a degree of polymerization greater than about 30. Such polymers are frequently identified hereinafter as "high polymer". These properties, couples with the relatively low melting points and viscosities of the cyclic oligomer mixtures, contribute to their utility as resin precursors, especially for high molecular weight resins, as described hereinafter.

Suitable cyclic oligomer mixtures may be prepared by a condensation reaction involving at least one compound selected from the group consisting of bishaloformates and thiol analogs thereof, said compounds having the formula (V)

or a mixture thereof with at least one dihydroxy compound having formula IV, wherein $R^4$ is as defined hereinabove and X is chlorine or bromine. (The compound of formula V or mixture thereof with that of formula IV is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula V and, optionally, formula IV, the bishaloformate composition may also contain other compounds, including oligomers of the formula (VI)

wherein $R^4$ and X are as previously defined and n is a small number, typically about 1–4.

While the X values in formula V may be chlorine or bromine, the bischloroformates, in which X is chlorine, are most readily available and their use is therefore preferred. (Frequent reference to dischloroformates will be made hereinafter, but it should be understood that other bishaloformates may be substituted therefor as appropriate.) Suitable dihydroxy compounds of formula IV include those having divalent radicals of formula II which are different from the corresponding divalent radicals in the compound of formula V. When such dihydroxy compounds are present, they generally comprise up to about 50%, most often up to about 20% and preferably up to about 10%, of the bischloroformate mixture. Most preferably, however, said mixture consists essentially of dischloroformates.

The tertiary amines useful in the oligomer formation reaction ("tertiary" in this context denoting the absence of N-H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the oligomer formation reaction is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in the first step the reagents and components are placed in contact under conditions wherein the bischloroformate composition is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the dischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scope of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003–0.6 mole thereof is used when it consists entirely of dischloroformate, and no more than about 0.5 mole is used when it is a mixture of compounds of formulas IV and V. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1–1.0:1 and most often about 0.2–0.6:1. The preferred molar ratio of alkali metal hydroxide to said composition is about 1.5–3:1 and most often about 2–3:1.

In a second step, the oligomer mixture may be separated from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0°–50° C.; the amount of bischloroformate composition used being up to about 0.7 mole for each liter of said organic liquid present in the reaction system, and the molar proportions of amine and alkali metal hydroxide to bischloroformate composition being approximately 0.2–1.0:1 and 2–3:1, respectively; and recovering the cyclic oligomers thus formed.

As in the embodiment previously described, another portion of said liquid may serve as a solvent for the bischloroformate composition. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLE 1

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux, with stirring, as 40 ml. of the bischloroformate solution was added over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

EXAMPLE 2

A solution of 1.4 mmol. of bisphenol A bischloroformate and 0.6 mmol. of 1,4-benzenedimethanol dischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene-1,4-dimethanol.

EXAMPLES 3–12

Following the procedure of Example 2, products containing at least about 80% mixed cyclic polycarbonate oligomers were prepared from mixtures of bisphenol A bischloroformate and the dihydroxy compounds listed in Table I. In each case, a total of 2 mmol. of bischloroformate composition was used. The proportion of the listed dihydroxy compound therein was 10 mole percent unless otherwise indicated.

TABLE I

| Example | Dihydroxy compound |
|---|---|
| 3 | 1,1-Bis(4-hydroxyphenyl)cyclohexane |
| 4 | 1,1-Bis(4-hydroxyphenyl)cyclododecane |
| 5 | 2,2-Bis(3,5-dimethyl-4-hydroxyphenyl)propane |
| 6 | 2,2-Bis(3,5-dibromo-4-hydroxyphenyl)propane |
| 7 | 2,2-Bis(4-hydroxyphenyl)-1,1-dichloroethylene |
| 8 | Hydroquinone |
| 9 | Hydroquinone (15 mole percent) |
| 10 | Bis(4-hydroxyphenyl) sulfide |
| 11 | Bis(4-hydroxyphenyl) sulfone |
| 12 | Bis(3,5-dimethyl-4-hydroxyphenyl) sulfone |

One aspect of the invention is a method for stabilizing a composition consisting essentially of cyclic polycarbonate oligomers as defined hereinabove. Stabilization is achieved by incorporating therein about 0.1–0.5 mole percent, based on structural units in said oligomer composition, of a Lewis acid of formula I. It is believed that the role of the Lewis acid is to inhibit polymerization initiated by impurities present in the oligomer composition.

Another aspect of the invention is a method for controlling the polymerization rate of such oligomer compositions by contact under polymerization conditions with a basic polycarbonate formation catalyst. Such control is also achieved by incorporating the Lewis acid in said composition, said Lewis acid being present in the amount of at least about 0.5 mole and generally no more than about 5 moles per mole of said catalyst. The effect of the Lewis acid may be inhibition or mild acceleration of the reaction, as noted hereinafter.

The polycarbonate formation catalysts which can be used in this aspect of the invention include various bases. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomer mixtures. Examples thereof are organometallic compounds such as n-butyllithium; basic alkali metal salts such as lithium phenoxide, sodium phenoxide, lithium 2,2,2-trifluoroethoxide, sodium benzoate and lithium stearate; and quaternary ammonium hydroxides such as tetramethylammonium hydroxide.

A particularly useful class of Lewis bases is disclosed in the aforementioned U.S. Pat. No. 4,605,731. It comprises alkali metal, quaternary ammonium and quaternary phosphonium tetraarylborates, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate.

Polymerization of the cyclic oligomer composition is typically effected by simply contacting said composition with the catalyst at temperatures up to 350° C., preferably about 200°–300° C., until polymerization has proceeded to the extent desired. Although the use of a solvent is within the scope of the invention, it is not required and is frequently not preferred. In general, the amount of catalyst used is about 0.001–1.0 mole percent based on structural units in the oligomer mixture.

The precise proportion of Lewis acid to be used in any instance will depend on various interdependent circumstances including the chemical properties of the particular oligomer composition used, the identity of the catalyst, the prevailing conditions of processing and polymerization and whether it is desired to accelerate or inhibit polymerization. One observation which is generally made is that the inhibitory effect of the Lewis acid is more pronounced with relatively "slow" catalysts (i.e., those which are effective at higher temperatures and/or cause polymerization at a comparatively low rate of reaction), such as alkali metal phenoxides, than with "fast" ones such as tetraphenylborates.

Among the tetraphenylborate catalysts, the following are listed in decreasing order of activity: tetra-n-butylphosphonium, tetra-n-butylammonium, tetraphenylphosphonium, tetramethylammonium. Polymerization with the least active of these may be totally inhibited at temperatures up to 250° C. by employing Lewis acid in a molar ratio of at least 1.5:1. The most active, on the other hand, will be considerably inhibited at 200° C. but will effect polymerization at nearly normal rates at 250° C. It should be noted that in any case where polymerization is totally inhibited in the presence of catalyst at a given temperature, it may be made to proceed by employing a higher temperature.

Another factor of importance is the presence or absence of a solvent during polymerization. When a non-polar solvent such as 2,4-dichlorotoluene or 1,2,4-trichlorobenzene is present, use of the Lewis acid at molar ratios as low as 1.5:1 can cause substantial inhibition at 200° C. For melt polymerization, higher molar ratios may be required under certain circumstances. This is believed to be attributable in part to the relatively high polarity of melt systems as opposed to those employing non-polar solvents, which promotes greater ionic dissociation and hence greater activity of the catalyst, and in part to the higher effective catalyst concentration in a solvent-free system.

Still another relevant factor under certain conditions is the method of incorporation of the catalyst and Lewis acid in the material to be polymerized. Thus, for solution polymerization the employment of Lewis acid in a molar ratio to catalyst up to 1:1 generally causes mild acceleration of polymerization. For melt polymerization, simple incorporation of Lewis acid and catalyst in a 1:1 ratio of the cyclics composition usually has little if any effect, but ratios above about 2:1 are inhibitory. However, inhibition in melt systems is found at ratios of 1:1 or higher when an initial step of intimately blending the catalyst and the Lewis acid, typically be dissolution in a common solvent such as methylene chloride followed by evaporation of the solvent, is employed.

In accordance with the above considerations, another aspect of the invention is a composition comprising at least one cyclic polycarbonate oligomer as defined hereinabove and about 0.005–5.0 mole percent, based on structural units in said oligomer, of a Lewis acid of formula I. In such compositions, the Lewis acid may obviously function either as a stabilizer or a polymerization rate controlling agent, depending on the intended conditions of treatment of the oligomer composition. A related aspect is compositions of this type which additionally contain about 0.001–1.0 mole percent, based on structural units, of a basic polycarbonate formation catalyst. Still another aspect is compositions prepared by blending said catalyst and at least about 0.5 mole, per mole of said catalyst, of said Lewis acid. p The linear polycarbonates produced in accordance with the invention may have somewhat lower molecular weights than those obtained in the absence of Lewis acid. However, the difference in molecular weight is generally not critical. Moreover, molecular weight can often be controlled by employing known chain transfer agents, of which diphenyl carbonate is an example, typically in amounts up to about 2.5 mole percent based on structural units in the oligomer mixture.

The invention is illustrated by the following examples. All polymer molecular weights were determined by gel permeation chromatography.

EXAMPLE 13

Five-gram samples (20 mmol. based on structural units) of a cyclic bisphenol A polycarbonate oligomer mixture similar to that of Example 1 but of relatively low purity and 0.0095 mmol. of triphenyl borate and triphenylborane, respectively, were dissolved in methylene chloride. The solvent was removed by rotary evaporation and the solids dried for 2 hours at 110° C. to produce intimate mixtures of cyclics and Lewis acid.

Samples comprising one gram of the resulting mixtures were heated in an oven at 250° C. for 2½ hours, or at 300° C. for 1 hour. Also heated at each temperature was a control comprising cyclics from the same batch with no Lewis acid incorporated therein. After the heating periods, the molecular weights of the samples were determined and percentage of polymerization determined therefrom. The percentage values in each sample and control is listed in Table II.

TABLE II

| Lewis acid | % polymerization | |
|---|---|---|
| | 250° C. | 300° C. |
| Triphenyl borate | 0 | 40 |
| Triphenylborane | 0 | — |
| Control | 100 | 100 |

An additional 1-gram sample of the cyclics-triphenyl borate blend was heated at 250° C. for 2½ hours and then combined with 1.1 mg. (0.00196 mmol.) of tetra-n-butylammonium tetraphenylborate by dissolution in methylene chloride, solvent removal and drying as described hereinabove. The resulting blend was heated to 300° C. for 15 minutes, yielding in 100% yield a polycarbonate having a weight average molecular weight of about 80,200. In comparison, a polymer prepared from a blend containing no Lewis acid had a molecular weight of about 97,900. Thus, polymerization proceeds under proper conditions even in the presence of the Lewis acid.

EXAMPLE 14

A mixture of 1 gram (3.94 mmol.) of a cyclic bisphenol A polycarbonate mixture similar to that of Example 1, 98.4 microliters of a 0.01M solution of tetra-n-butylammonium tetraphenylborate in toluene (0.0009 mmol.), 0.5 mg. (0.0022 mmol.) of triphenylborane, 12.7 mg. (0.059 mmol.) of diphenyl carbonate and 10 ml. of dry 2,4-dichlorotoluene was heated to reflux (about 196° C.) for 4 hours. Analysis at the end of this time showed that no polymerization had occurred. By contrast, a control containing no triphenylborane exhibited polymerization in the amount of 70% by weight after ½ hour.

Following the same procedure, several other blends were prepared and heated, with samples being periodically removed and analyzed. The results are given in Table III.

TABLE III

| Lewis acid | Catalyst | Molar ratio Lewis acid: catalyst | ½ hr. | 1 hr. | 2 hr. |
|---|---|---|---|---|---|
| None | Sodium phenoxide | — | 63 | 66 | 66 |
| Triphenylborane | Sodium phenoxide | 0.5:1 | 86 | 85 | 89 |
| Triphenylborane | Sodium phenoxide | 1:1 | 82 | 84 | 89 |
| Triphenylborane | Sodium phenoxide | 2:1 | 0 | 0 | 0 |
| Triphenyl borate | Sodium phenoxide | 2:1 | 0 | 0 | 0 |
| Aluminum isopropoxide | Sodium phenoxide | 2:1 | 31 | 53 | 74 |
| None | Tetraethylammonium phenoxide | — | 34.5 | 39 | — |
| Triphenylborane | Tetraethylammonium phenoxide | 1.5:1 | 0 | 0 | 0 |
| None | Tetra-n-butylammonium tetraphenylborate | — | 93 | — | — |
| Triphenylborane | Tetra-n-butylammonium tetraphenylborate | 1:1 | 0 | 0 | 0 |

The tabulated results clearly show the effect of Lewis acids on the polymerization rate of the cyclic oligomer composition. With sodium phenoxide as catalyst, mole ratios of Lewis acid to catalyst up to 1:1 accelerate and higher mole ratios inhibit polymerization. With tetra-n-butylammonium tetraphenylborate, on the other hand, a Lewis acid at 1:1 completely inhibits polymerization.

EXAMPLE 15

A solution in 40 ml. of methylene chloride was prepared from 2 grams (7.87 mmol.) of a cyclic bisphenol A polycarbonate oligomer mixture similar to that of Example 1, 4.4 mg. (0.0078 mmol.) of tetra-n-butylammonium tetraphenylborate and various quantities of triphenyl borate. The solvent was evaporated and the solids dried as described in Example 13. Samples comprising 500 mg. of the resulting blends were heated at 200° C. for ½ hour and then dissolved in methylene chloride and precipitated by pouring into methanol. The products were dried and analyzed, in comparison with a control containing no triphenyl borate.

Figure 1:
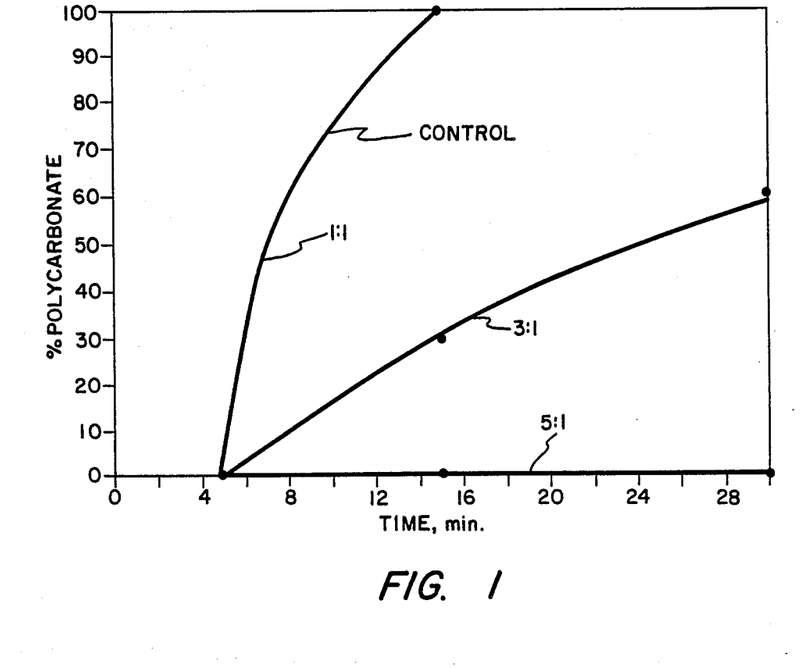
FIGS. 1–3 are a graphical representation of the results obtained in Examples 15–17.

The results are shown graphically in FIG. I. It is apparent that the control was completely polymerized after 15 minutes and that a 1:1 molar ratio of Lewis acid to catalyst produced an effect not appreciably different from the control, but that increasing degrees of polymerization inhibition were seen at higher mole ratios.

EXAMPLE 16

A solution of 56.1 mg. (0.1 mmol.) of tetra-n-butylammonium tetraphenylborate and 29 mg. (0.1 mmol.) of triphenyl borate in 4 ml. of methylene chloride was stirred at room temperature for 1 hour, after which the solvent was removed and the catalyst-Lewis acid combination dried as described in Example 13.

A solution in 30 ml. of methylene chloride was prepared from 2 grams (7.87 mmol.) of a cyclic bisphenol A polycarbonate oligomer mixture similar to that of Example 1 and 6.7 mg. of the catalyst-Lewis acid blend (0.1 mole percent of catalyst based on structural units in the oligomer mixture). The solvent was removed and the solids dried as described in Example 13. Three 500-mg. samples of the solids were then heated at 200° C. for 5 minutes, 15 minutes and 30 minutes, respectively, and another three samples were similarly heated at 250° C. The products were dissolved in methylene chloride, precipitated by pouring into methanol and analyzed.

Figure 2:
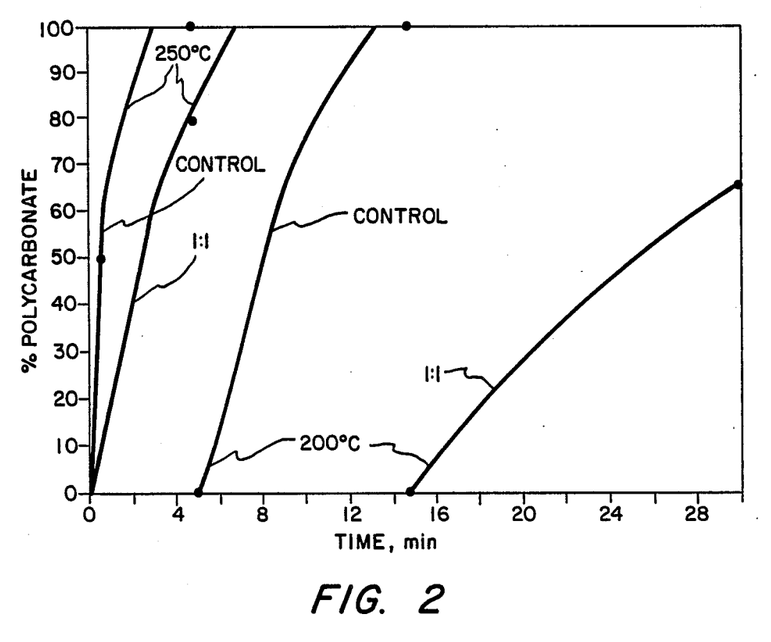

The results are shown graphically in FIG. II. It is apparent, upon comparison with FIG. I, that the polymerization activity of the present cyclics batch was somewhat greater than that of the batch of Example 15; and also that a substantially higher degree of inhibition was produced at 200° C. by using a 1:1 molar ratio of Lewis acid to catalyst under the present conditions, whereby the catalyst and Lewis acid were premixed, than under the conditions of Example 15 where no such premixing step was employed.

EXAMPLE 17

Figure 3:
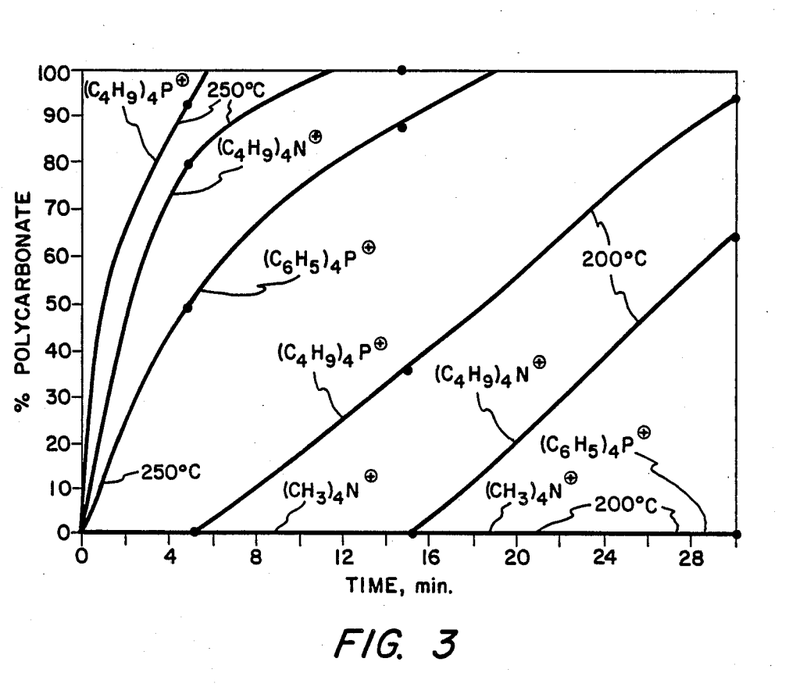

Following the procedure of Example 16, several combinations of tetraphenylborate catalysts and triphenyl borate in a 1:1 molar ratio were prepared and combined with cyclics. The combinations were then heated at either 200° or 250° C. The results are shown graphically in FIG. III. The relative activities of the various catalysts and inhibitory effects of the triphenyl borate are clearly evident, particularly in the 250° C. runs.

EXAMPLE 18

Following the procedure of Example 16, triphenyl borate and lithium phenoxide were combined in molar ratios of 1:1 and 3:1. An amount of the resulting blend equal to 492.1 mg. (4.9 mmol.) of lithium phenoxide was combined with 10 grams (394 mmol.) of a cyclic bisphenol A polycarbonate oligomer mixture similar to that of Example 1, and melt polymerizations were carried out on samples of the resulting blends at 250° and 300° C. for periods of 5, 10 and 15 minutes. The results are given in Table IV.

TABLE IV

| Polymerization temp., °C. | Molar ratio, Lewis acid:catalyst | % polymerization | | |
|---|---|---|---|---|
| | | 5 min. | 10 min. | 15 min. |
| 250 | 1:1 | 11 | 42 | 73 |
| | 3:1 | 0 | 0 | 0 |
| 300 | 1:1 | 100 | 100 | 100 |
| | 3:1 | 16 | 75 | 84 |

These results show that with the slightly less active catalyst lithium phenoxide, substantial inhibition of polymerization is noted even at 300° C. with a 3:1 molar ratio of Lewis acid to catalyst.

What is claimed is:

1. A composition prepared by blending a basic polycarbonate formation catalyst and at least about 0.5 mole, per mole of said catalyst, of a Lewis acid of the formula wherein Z is boron or aluminum and each of $R^1$, $R^2$ and $R^3$ is a hydrocarbon or hydrocarbonoxy radical containing up to about 10 carbon atoms.

2. A composition according to claim 1 wherein Z is boron, each of $R^1$, $R^2$ and $R^3$ is aromatic and the catalyst is an organometallic compound, basic alkali metal salt, quaternary ammonium hydroxide or alkali metal, quaternary ammonium or quaternary phosphonium tetraarylborate.

3. A composition according to claim 2 wherein the Lewis acid is present in the amount of about 1.5–5 moles per mole of said catalyst.

4. A composition according to claim 3 wherein the catalyst is a quaternary ammonium or quaternary phosphonium tetraphenylborate.

5. A composition according to claim 4 wherein each of $R^1$, $R^2$ and $R^3$ is phenyl or phenoxy.

* * * * *